United States Patent [19]

Lee

[11] Patent Number: 5,550,871
[45] Date of Patent: Aug. 27, 1996

[54] SATELLITE COMMUNICATION RECEIVING APPARATUS

[75] Inventor: Jin-Seok Lee, Kyonggi-Do, Rep. of Korea

[73] Assignee: Hyundai Electronics Industries, Co., Ltd., Kyonggi-do, Rep. of Korea

[21] Appl. No.: 362,257

[22] Filed: Dec. 22, 1994

[30] Foreign Application Priority Data

Dec. 29, 1993 [KR] Rep. of Korea .................. 93-30577

[51] Int. Cl.⁶ ..................................... H04L 27/06
[52] U.S. Cl. ............................................ 375/344
[58] Field of Search ........................... 332/103, 123, 332/126, 162; 375/344, 345, 324; 455/3.2, 182.2, 192.2, 136; 329/319, 308

[56] References Cited

U.S. PATENT DOCUMENTS

| | | |
|---|---|---|
| 4,896,336 | 1/1990 | Henely et al. .................. 375/324 |
| 5,271,041 | 12/1993 | Montreuil ......................... 375/344 |
| 5,375,146 | 12/1994 | Chalmers ......................... 375/344 |

*Primary Examiner*—Stephen Chin
*Assistant Examiner*—Kevin Kim
*Attorney, Agent, or Firm*—Morgan & Finnegan, L.L.P.

[57] ABSTRACT

A satellite communication receiving apparatus capable of receiving a satellite communication broadcasting using an L-band and Phase Shift Keying(PSK) by sharing a temperature compensation voltage control oscillator with a voltage control oscillator used in Costas-loop and a local oscillator used in an intermediate frequency apparatus, thereby securing an effective satellite communication broadcasting receiving and facilitating a simplification thereof is disclosed. The present invention includes a modulator for generating an intermediate frequency using a satellite broadcasting signal obtained through an L-band receiving antenna, a low-noise amplifier a first band filter and a local oscillating frequency oscillated by an external base frequency; a Costas loop circuit for recovering an intermediate frequency obtained at the modulator using a base frequency shifted by 90°; and sampling circuit for obtaining modulation data by sampling the signals at the Costas loop circuit.

3 Claims, 4 Drawing Sheets

SATELLITE COMMUNICATION RECEIVING APPARATUS

BACKGROUND OF THE INVENTION

1. Field of the Invention

The present invention relates to a satellite communication receiving apparatus, and in particular to a satellite communication receiving apparatus capable of receiving a satellite communication broadcasting using an L-band and a Phase Shift Keying(PSK) by sharing a temperature compensation voltage control oscillator with a voltage control oscillator used in Costas-loop and a local oscillator used in an intermediate frequency apparatus, thereby securing effective satellite communication broadcasting receiving and facilitating a simplification thereof.

2. Description of the Conventional Art

Conventionally, a satellite communication receiving apparatus using a L-band phase shift keying method, as shown in FIG. 2, includes an L-band receiving antenna 100 for receiving satellite communication broadcasting signals from a satellite; a Low Noise Amplifier(LNA) 101 for facilitating the frequency of the satellite communication signals from the antenna 100 to be a predetermined level without undesired noises; a first amplifier 102 for amplifying the satellite communication signals up to a predetermined level, in which the frequency is converted at the low noise amplifier 101; a first band filter 103 for filtering all bands of the signals amplified at the first amplifier 102; a second amplifier 104 for amplifying all band signals filtered at the first band filter 103; a modulator 105 for generating an intermediate frequency by mixing the signals amplified at the second amplifier 104 with the local oscillating frequency, respectively, for a 90° phase keying; and a demodulator 112 for modulating the intermediate frequency signals keyed at the modulator 105 and for obtaining data from the keyed signals.

The modulator 105 includes a temperature compensating oscillator 111 for oscillating a base frequency; a first to third intermediate frequency generator 106 to 108 for sequentially generating intermediate frequencies by mixing the local oscillating frequency generated in response to the base frequency from the temperature compensating oscillator 111 and the signals inputted from the second amplifier 104; a gain control amplifier 109 for outputting the level changes of the intermediate frequency signals outputted from the third intermediate frequency generator 108; and a sixth amplifier 110 for amplifying the intermediate frequency signals amplified at the gain control amplifier 109 to a predetermined level and for transferring the amplified signals to the demodulator 112.

The first intermediate frequency generator 106 included a first phase synchronous loop circuit 106a for generating a local oscillating frequency by the base frequency oscillated from the temperature compensating oscillator 111; a first mixer 106b for mixing the local oscillating frequency generated at the first phase synchronous loop circuit 106a and the satellite broadcasting signals from the second amplifier 104; a second band filter 106c for filtering the output signals of the first mixer 106b; and a third amplifier 106d for amplifying the band signals filtered at the second band filter 106c and for inputting the amplified signals into the second intermediate frequency generator 107.

The third amplifier 106d consisted of a second phase synchronous loop circuit 107a, a second mixer 107b, a third band filter 107 and a fourth amplifier 107d, the same as the first intermediate frequency generator 106.

In addition, the third intermediate frequency generator 108 consisted of a third phase synchronous loop circuit 108a, a third mixer 108b, a fourth band filter 108c and a fifth amplifier 108d, the same as the first and second intermediate frequency generators 106 and 107.

The modulator 112 consisted of a Costas loop circuit 113 for keying the intermediate frequency keyed at the modulator 105 and a sampling circuit 114 for outputting the signals outputted from the Costas loop circuit 113.

The Costas loop circuit 113 includes a first and second phase detection circuits 113a and 113b for keying the signals from the sixth amplifier 110 of the modulator 105; first and second low band filters 113d and 113i for respectively passing the frequency lower than the cut frequency from the output of the first and second phase detection circuits 113a and 113b; a multiplier 113e for outputting the value in proportion to the multiplication of the two input signals passed from the first and second low band filters 113d and 113i; a third low band filter 113f for filtering the output signals of the multiplier 113e; an integrator 113g for outputting the integrated value in proportion to the signals filtered at the third low band filter 113f; a voltage control oscillator 113h for oscillating the control voltage oscillating frequency by the integrated value outputted at the integrator 113g and for inputting the oscillated frequency into the first phase detection circuit 113a; and a 90° shifter 113c for shifting the output signals of the voltage control oscillator 113h by 90° and sending the shifted signals to the second phase detection circuit 113b.

In addition, the sampling circuit 114 includes a comparator 114a for separating the analog signal wave modulated through the second low filter 113i into a plus voltage and a minus voltage and a clock generator 114b for sampling the signals inputted from the second low band filter 113i in response to the value inputted from the comparator 114a.

As described above, the conventional satellite communication receiving apparatus using the L-band phase shift keying method is directed to convert the satellite communication signals received from the L-band receiving antenna 100 into a predetermined level through the low noise amplifier 101 which signals are amplified through the first amplifier 102 and filtered through the first band filter 103.

The satellite broadcasting signals filtered through the first band filter 103 are amplified and outputted through the second amplifier 104.

The signals amplified through the second amplifier 104 are mixed through the first mixer 106b with the frequencies oscillated by the temperature compensating oscillator 111 and the first phase synchronous loop circuit 106a of the first intermediate frequency generator 106, filtered through the second band filter 106c, amplified through the third amplifier 106d, and inputted into the second intermediate frequency generator 107. The signals outputted from the third amplifier 106d are sequentially inputted into the second intermediate frequency generator 107 and the third intermediate frequency generator 108.

The third intermediate frequency is compensated for input level changes through the gain control amplifier 109, amplified through the sixth amplifier 110 and inputted into the modulator 112.

At this time, if the signal inputted therefrom is X1, X1, filtered at the first low band filter 113d through the second phase detection circuit 113b is inputted into the multiplier 113e. Then, if the signal inputted into the multiplier 113e is X3, a signal at the multiplier 113e in proportion to the input two signals is outputted therefrom.

The signals are filtered through the third low band filter 113f, integrated through the integrator 113g, and inputted into the voltage control oscillator 113h.

The voltage control oscillator 113h outputs the oscillating frequency in response to the control voltage Vt and inputs the frequency into the first and second phase detection circuits 113a and 113b in a 90° shifted form.

The signals outputted at the Costa loop circuit 113 are inputted into the clock generator 114b and the sampling circuit 114, of which one part thereof is inputted in an inputted state and the other part of thereof is inputted through a comparator 114a as the signals needed in generating the clocks at the clock generating circuit 114b.

The clock generating circuit 114b modulates the signals received from the antenna 100 for the digital signals.

However, since the conventional satellite communication receiving apparatus using the L-band phase shift keying method utilizes the multi-phases of the mixer in order to modulate the signals of the L-band phase shift keying, generates the third intermediate frequency at the third intermediate frequency generator, and modulates the desired digital data from the third intermediate frequency, a plurality of band filter, mixer, phase synchronous loop circuits and temperature compensating oscillating circuits for the base oscillating frequency are additionally needed, thereby causing a relatively complicated design process and undesired repetitive parts.

SUMMARY OF THE INVENTION

Accordingly, it is an object of the present invention to provide a satellite communication receiving apparatus, and in particular to provide a satellite communication receiving apparatus capable of receiving a satellite communication broadcasting using a L-band and a Phase Shift Keying(PSK) by sharing a temperature compensation voltage control oscillator with a voltage control oscillator used in Costas-loop and a local oscillator used in an intermediate frequency apparatus, thereby securing effective satellite communication broadcasting receiving and facilitating a simplification thereof.

To achieve the object of the present invention a modulator for generating an intermediate frequency using a satellite broadcasting signal obtained through an L-band receiving antenna, low-noise amplifier and a first band filter and a local oscillating frequency oscillated by an external base frequency; a Costas loop circuit for recovering an intermediate frequency obtained at the modulator using a base frequency shifted by 90°; and sampling circuit for obtaining a modulation data by sampling the signals at the Costas loop circuit are included.

DESCRIPTION OF THE PREFERRED EMBODIMENTS

Figure 3:
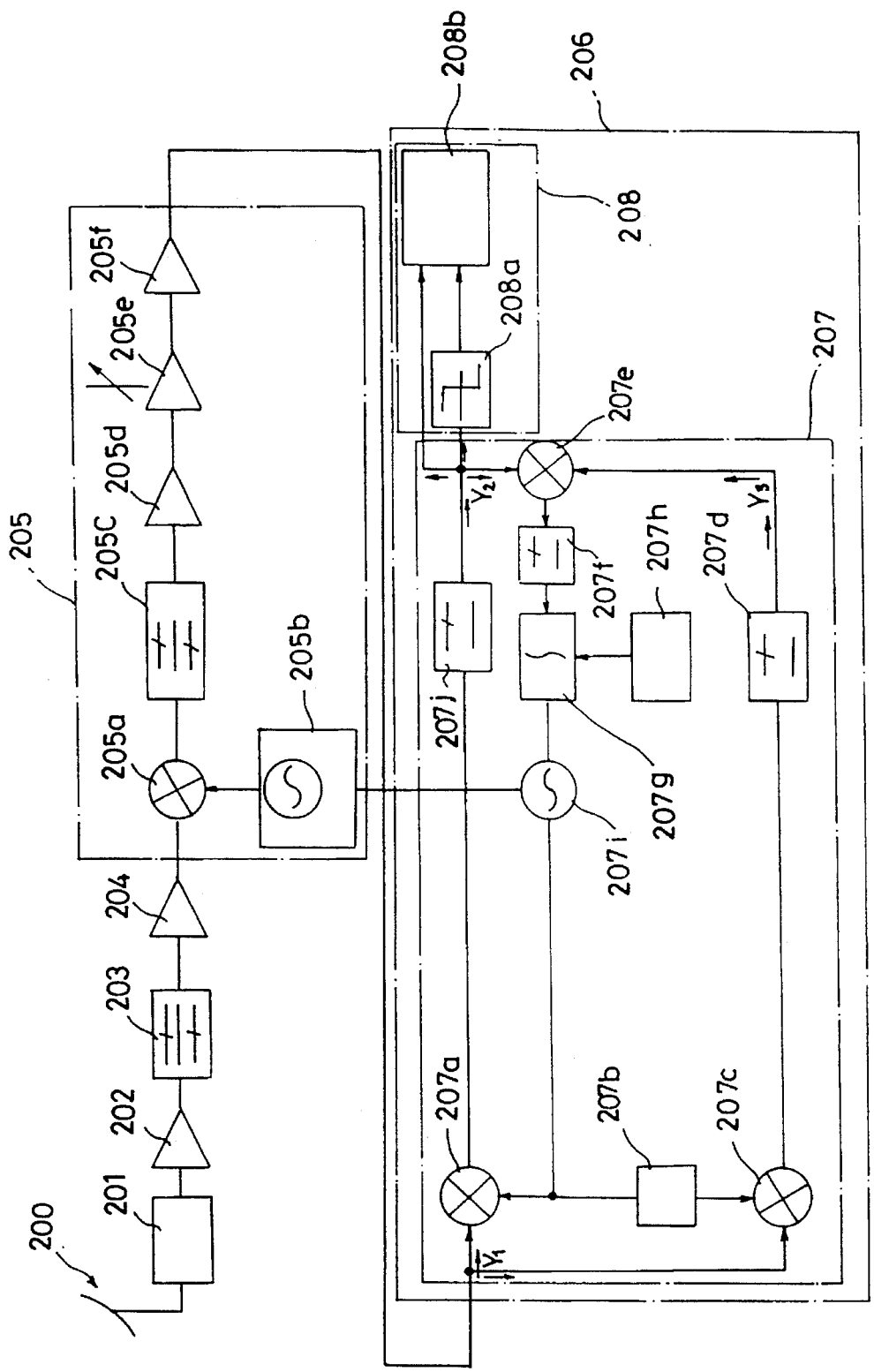
FIG. 3 is a block diagram showing a satellite communication receiving apparatus according to the present invention.
Figure 5:
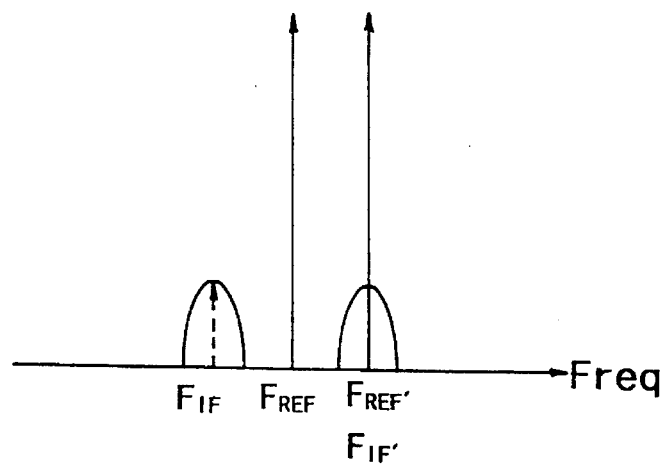
FIG. 5 is a diagram showing a state which the synchronies of the two frequency is fitted to the initial state in case that the intermediate frequency shown in FIG. 3 is smaller than the base frequency.

Referring to FIG. 3, there is shown a block diagram of a satellite communication receiving apparatus according to the present invention. As shown therein, the present invention includes a L-band receiving antenna 200 for receiving satellite communication broadcasting signals from a satellite; a low noise amplifier 201 for lowering a frequency of the satellite broadcasting signals received from the L-band receiving antenna 200 in a state with no undesired noise; a first amplifier 202 for amplifying the satellite broadcasting signals converted at the low noise amplifier 201 to a predetermined level; a first band filter 203 for filtering all bands of the signals amplified at the first amplifier 202; a second amplifier 204 for amplifying all band signals filtered at the first band filter 203 to a predetermined level; a modulator 205 for generating a single intermediate frequency by mixing the signals amplified at the second amplifier 204 with the local oscillating frequency according to the external base frequency and for shifting the mixed signals by 90°; and a demodulator 206 for demodulating the intermediate frequency signals keyed at the modulator 205 to the original signals and for obtaining the data from the demodulated signals.

The modulator 205 includes a mixing apparatus 205b for oscillating a local oscillating frequency by a base frequency from the demodulator 206; a mixer 205a for mixing the local oscillating frequency oscillated at the mixing apparatus 205b and the signals inputted from the second amplifier 204; a second band filter 205c for filtering the intermediate frequency signals outputted from the mixer 205a; a third amplifier 205d for amplifying the intermediate frequency signals filtered at the second band filter 205c to a predetermined level; a gain control amplifier 205e for outputting intermediate frequency signals amplified at the third amplifier 205d; and a fourth amplifier 205f for amplifying the intermediate frequency signals gain-controlled at the gain control amplifier 205e to a predetermined level and for sending the amplified signals to the demodulator 206.

The demodulator 206 includes a Costas loop circuit 207 for recovering the intermediate frequency modulated at the modulator 205 by over 90° using the base frequency and a sampling circuit 208 for sampling the signals demodulated at the Costas loop circuit 207 and for obtaining the demodulated data.

The Costas loop circuit 207 includes a first and second phase detection circuit 207a and 207c for demodulating the signals received from the modulator 205; a first and second low band filter 207d and 207j for low-filtering the signals inputted from the first and second phase detection circuits 207a and 207c; a multiplier 207e for outputting the values in proportion to the multiplication of the output signals of the first and second low filters 207d and 207j; a third low band filter 207f for low-filtering the signals outputted from the multiplier 207a; an integrator 207g for integrating the signals filtered at the third low band filter 207f; a reset circuit 207h for resetting the integrator 207f; a temperature compensating voltage control oscillating circuit 207i for compensating the changes of the output frequency according to the temperature by the integrating value outputted from the integrator 207g; and a 90° shifter 207b for shifting the oscillating frequency by a 90° at the temperature compensating voltage control oscillating circuit 207i and for providing the shifted frequency to the second phase detection circuit 207c.

The sampling circuit 208 includes a comparator 208a for dividing the signal wave filtered at the second low band filter 207j into a plus voltage and a minus voltage with a basis of zero voltage and a clock generating circuit 208b for generating the clocks synchronized to the signal waves compared at the comparator 208a and for sampling the signals.

The operation of the present invention will now be explained in detail.

Figure 1:
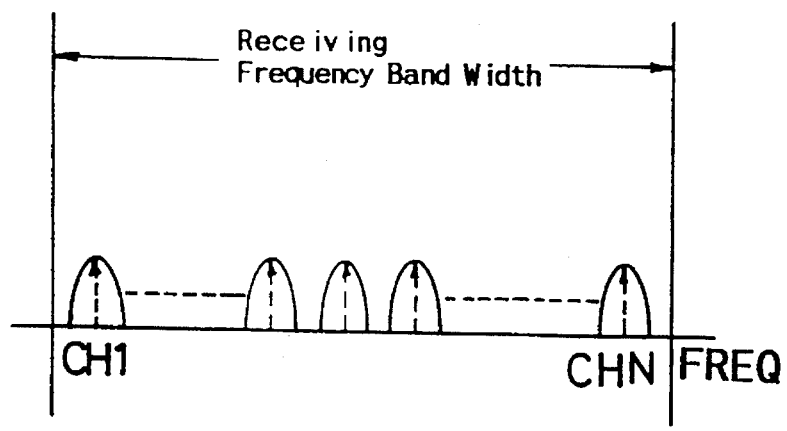
FIG. 1 is a diagram showing a frequency spectrum of a satellite communication using conventional phase keying.

The frequency spectrum at the satellite communication using the phase shift keying method received from the L-band receiving antenna is shown in FIG. 1.

As shown therein, it is available to select one channel among the channels channel 1 to channel N.

The satellite broadcasting signals received through the L-band receiving antenna are frequency-converted at the low noise amplifier 201.

The signals outputted from the low noise amplifier 201 are amplified at the first amplifier 202 by a predetermined level and filtered at the first band filter 203.

At this time, the band width BW of the band filter 203, as shown in FIG. 1, is covered over from channel 1 to channel N.

The filtered signals at the band filter 203 are amplified at the second amplifier 204 by a predetermined level and inputted into the mixer 205a of the modulator 205.

The mixer 205a of the modulator 205 detects the intermediate frequency by mixing the local oscillating frequency inputted from the mixing apparatus 205b with the satellite broadcasting signals inputted from the second amplifier 204. The role of the base frequency used in the mixing apparatus 205b is to use the temperature compensating voltage control oscillating circuit 207i used in the Costa loop circuit 207.

For generating these kinds of frequencies, the intermediate frequency is previously set as one frequency, where, the relationship between an intermediate frequency $F_{IF}$, a local oscillating frequency $F_{LO}$, and a high frequency $F_{RF}$ can be given as one formula: $F_{IF}=F_{LO}-F_{RF}$.

Thus, in order to receive the desired channel at the mixing apparatus 205b, the frequency is derived from the formula Local oscillating frequency $F_{LO}$=High frequency $F_{RF}$+Intermediate frequency $F_{IF}$.

The intermediate frequency signals generated through the aforementioned formula are band-filtered at the second band filter 205c, amplified through the third amplifier 205d to a predetermined level, and inputted into the gain control amplifier 205f.

The gain control amplifier 205e automatically compensates for the level changes of the inputted signals and inputs the compensated signals into the fourth amplifier 205f.

The fourth amplifier 205f amplifies the signals compensated at the gain control amplifier 205e and inputs the amplified signals into the first and second phase detection circuits 207 and 207c of the Costas loop circuit 207.

At this time, if the signals inputted into the first and second phase detection circuits 207a and 207c is Y1, the Y1 is mixed with the base frequency oscillated from the temperature compensating voltage control oscillator 207i, low-filtered at the second low band filter 207j, and inputted into the comparator 208a of the multiplier 207e and the sampling circuit 206.

At this time, the signal coming from the second low band filter 207j is Y2.

Meanwhile, the Y1 outputted from the modulator 205 is mixed with the base frequency which is over 90° through the second phase detection circuit 207c, low-filtered through the first low band filter 207d, and inputted into the multiplier 207e.

At this time, the signal from the first low band filter is Y3, the multiplier 207e outputs the signals in proportion to the input of both Y2 outputted from the second low band filter 207j and Y3 outputted from the first low band filter 207d.

The signals outputted from the multiplier are low-filtered at the third low band filter 207f and inputted into the integrator 207g.

The integrator 207g generates the control voltage for the temperature compensating voltage oscillator 207i in response to the rest of the signals generated at the reset circuit 207h and in which the reset circuit 207h for setting an initial value to the temperature compensating voltage control oscillator 207i at the initial state of the circuit is connected thereto.

The signals outputted at the integrator 207g are inputted into the temperature compensating voltage control oscillator 207i and the oscillating frequency generated by the control voltage are inputted into the Y2 and Y3. Here, when the oscillating frequency is inputted into the Y3, it is shifted by 90° through the 90° shifter 207b.

In addition, the base frequency outputted from the temperature compensating voltage control oscillator 207i are inputted into the mixing apparatus 205b of the modulator 205.

Thus, the base frequency of the temperature compensating voltage loop circuit 207i and the output frequency of the mixing apparatus 205b in the Costas loop circuit 207 are combined with each other.

The signals outputted from the second low band filter 207j of the Costas loop filter 207 are inputted into the clock generating circuit 208b and the comparator 208a of the sampling circuit 208, of which one part thereof is outputted in its original state and the other part thereof is outputted as the signals needed for clock generation through the comparator 208a.

In this fashion clocks synchronized to the inputted data at the clock generating circuit 208b are generated and the signals inputted from the L-band receiving antenna are digitally modulated by sampling the clocks.

However, the frequencies are actually not coincident with each other at the initial state.

Figure 4:
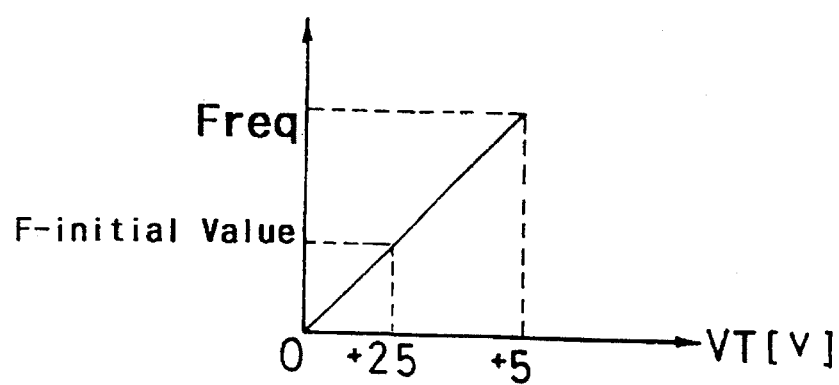
FIG. 4 is a diagram showing a relationship between a voltage of a voltage control circuit and a base frequency shown in FIG. 3.
Figure 2:
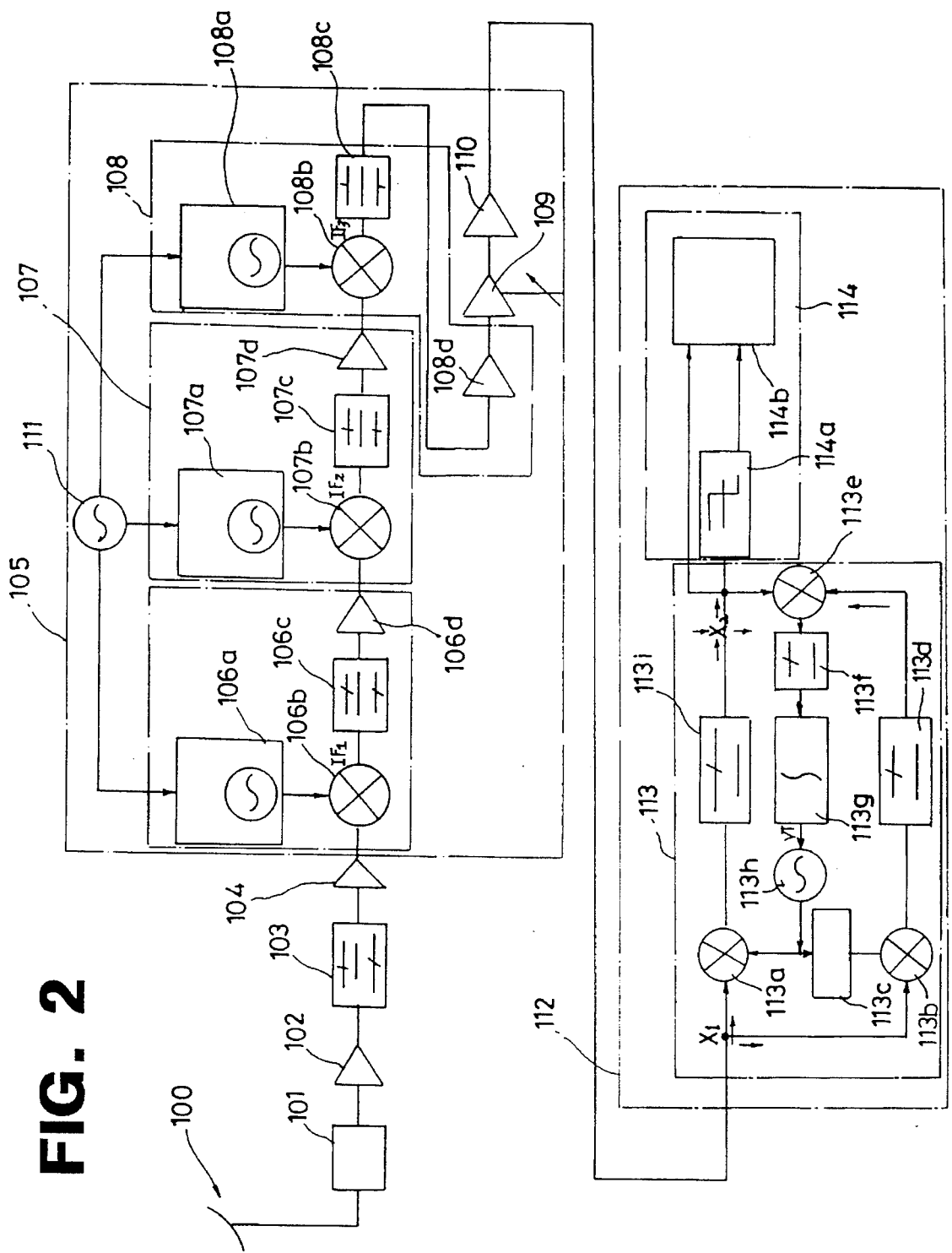
FIG. 2 is a block diagram showing a conventional satellite communication receiving apparatus.

How the present invention operates will now be explained in the aforementioned noncoincident state. The relationship between the intermediate frequency and the voltage of the temperature compensating voltage control oscillator 207i and the base frequency in the initial state is shown in FIG. 4. At this time, the voltage value thereof is 2.5 V at the reset circuit 207h connected to the integrator 207g.

If the first intermediate frequency $F_{IF}$ is smaller than the base frequency $F_{REF}$, when the power is supplied thereto, the initial voltage is +2.5 V.

Based upon the voltage value, the base frequency is given thereby and thereafter the local oscillating frequency of the mixing apparatus 205b is generated, if the other conditions are the same, as the base frequency is large, the local oscillating frequency is also large.

If the intermediate frequency is smaller than the base frequency, by increasing the voltage value at the Costas loop circuit 207 in order to increase the base frequency, the local oscillating frequency is increased thereby and thereafter the intermediate frequency is increased accordingly.

The relationship between the intermediate frequency $F_{IF}$ and the base frequency $R_{REF}$ meet the conditions Intermediate frequency $F_{IF}$ and Base frequency $R_{REF}$.

If assuming that the local oscillating frequency is equal to the N-base frequency and the base frequency is changed in +1[Hz] and −1[Hz], the local oscillating frequency changes as much as =N[Hz] and −N[Hz].

When the initial voltage value is +2.5 V and when there is a difference Delta frequency=Base frequency−intermediate frequency, the base frequency which is an output frequency of the temperature compensating voltage control oscillator 207i increase as the voltage value of the Costas loop circuit 207 increases.

If the base frequency is increased as much as X[Hz], the local oscillating frequency is increased as much as NX[Hz].

The relationship between a changed intermediate frequency, a base frequency, and a local oscillating frequency, that is, the relationship between an intermediate frequency $F_{IF}$, a base frequency $F_{REF}$, and a local oscillating frequency $F_{LO}$ is as follows.

Where, Base frequency $F_{REF'}$=Base frequency $F_{REF}$+X, and

Local oscillating frequency $F_{LO'}$=Local oscillating frequency $F_{LO}$+NX,

Intermediate frequency FIF, =Local oscillating frequency $F_{LO'}$-high frequency=Local oscillating frequency-High frequency+NX=Intermediate frequency+NX.

In order to modulate the received data, the condition Intermediate frequency $F_{IF}$=Base frequency $F_{REF}$ is met, when Base frequency+X is equal to Intermediate frequency+NX. That is, when X=(Base frequency-intermediate frequency)/(N−1), the data is modulated.

When the Costas loop circuit 207 changes the voltage value and makes the base frequency the base frequency $F_{REF}$, the frequency synchronization of all the receiver is made and thereby the phase synchronization is made.

Figure 6:
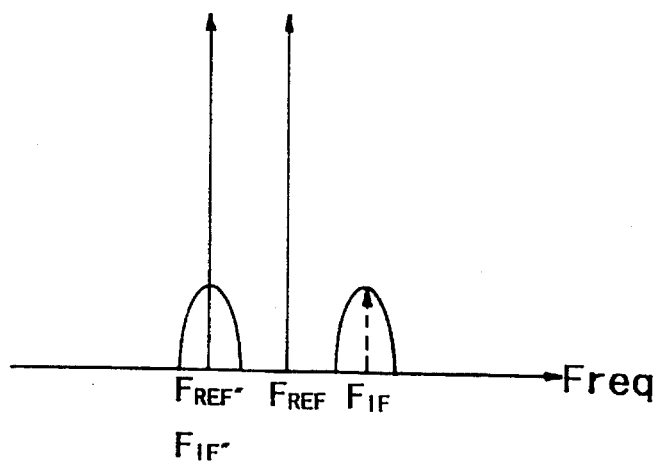
FIG. 6 is a diagram showing a state which the synchronies of the two frequency is fitted to the initial state in case that the intermediate frequency shown in FIG. 3 is larger than the base frequency.

When the second intermediate frequency $F_{IF}$ is larger than the base frequency $F_{REF}$, the base frequency, as shown in FIG. 6, is made when the initial value of 2.5 V is applied to the temperature compensating voltage control oscillating circuit 207i and thereby the local oscillating frequency is made at the mixing apparatus 205b.

Referring now to FIG. 6, the process of satisfying the condition of Intermediate frequency $F_{IF'}$=Base frequency $F_{REF'}$ is as follows.

The base frequency is lowered by decreasing the voltage value at the Costas loop circuit 207 when the conditions of Local oscillating frequency=N-base frequency and Intermediate frequency-Base frequency=Delta frequency are met, the initial value thereof is applied to the mixing apparatus as an initial value and thus the intermediate frequency is thereby lowered.

When the base frequency is decreased by X[Hz], the local oscillating frequency is lowered by NX[Hz].

If a changed frequency, a base frequency, a local oscillating frequency are respectively an intermediate frequency $F_{IF'}$, a base frequency $F_{REF'}$, and a local oscillating frequency $F_{LO'}$, the relationship is as follows.

Where, Base frequency=Base frequency-X, and

Local oscillating frequency=Local oscillating frequency-NX, a formula Intermediate frequency=Local oscillating frequency-High frequency=Local oscillating frequency-High frequency-NX=Intermediate frequency-NX is obtained.

In order that the received data may be modulated, the condition Intermediate frequency=Base frequency-NX, that is, X=(Intermediate-Base frequency)/(N−1) should be met, whereby the phase synchronization can be secured.

The data generated at the Costas loop 207 through both the first and second processes generates the clocks which are coincident to the input-data rate, and thereby the complete digital data is recovered at the sampling circuit 208.

As described above, a satellite communication receiving apparatus is capable of receiving a satellite communication broadcasting using an L-band and Phase Shift Keying(PSK) by sharing a temperature compensation voltage control oscillator with a voltage control oscillator used in Costas-loop and a local oscillator used in an intermediate frequency apparatus, thereby securing an effective satellite communication broadcasting receiving and facilitating a simplification thereof.

What is claimed is:

1. A satellite communication receiving apparatus, comprising:

modulating means for mixing satellite broadcast receiving signals obtained through an L-band receiving antenna, a low-noise amplifying means, a first bandpass filter means and a local oscillating frequency obtained in accordance with a reference frequency signal applied thereto, and for generating an intermediate frequency signal; and demodulating means for generating a temperature compensation voltage control oscillating signal in accordance with the intermediate frequency signal outputted from said modulating means, for inputting said temperature compensation voltage control oscillating signal to the modulating means as a reference frequency signal, and for recovering said intermediate frequency signals keyed to said satellite broadcast receiving signals.

2. The apparatus of claim 1, wherein said modulating means includes:

a mixing apparatus for generating a local oscillating frequency in accordance with a reference frequency signal inputted from the demodulating means;

mixing means for mixing output signals of said mixing apparatus and said satellite broadcast receiving signal;

second bandpass filter means for detecting an intermediate frequency signal among the output signals of said mixing means;

amplifying means for amplifying the output signal of said second bandpass filter means: and gain control amplifying means for compensating the level variation of the intermediate frequency signal amplified by said amplifying means and for outputting the compensated intermediate frequency signals to the modulating means.

3. The apparatus of claim 1, wherein said demodulating means includes:

first and second phase detection means for phase-detecting the signals outputted from the modulating means in accordance with a reference signal applied thereto;

first and second lowpass filter means for detecting a low band signal among the output signals of said first and second phase detection means;

a multiplier for multiplying the output signals of the first and second lowpass filter means;

third lowpass filter means for detecting low band signals from said multiplier;

integrating means for integrating the output signals outputted from said third lowpass filter means;

resetting means for resetting said integrating means and for outputting a previously set initial value;

temperature compensating voltage control oscillating means for compensating the variation of the temperature and for outputting a reference frequency signal oscillated in accordance with an output signal of the integrating means and for inputting the reference frequency signal to the first phase detection means;

90° shifter for shifting the phase of said temperature compensating voltage control oscillating means by 90° and for inputting the reference signal to the first phase detection means; and sampling means for sampling the output signals of the first lowpass filter means.

* * * * *